March 10, 1970

R. D. HITCHCOCK 3,500,145

THIN VAPOR-DEPOSITED METAL FILM VOLTAGE REGULATOR

Filed March 1, 1967

INVENTOR.
ROBERT D. HITCHCOCK
BY
ATTORNEY.

March 10, 1970  R. D. HITCHCOCK  3,500,145
THIN VAPOR-DEPOSITED METAL FILM VOLTAGE REGULATOR
Filed March 1, 1967  2 Sheets-Sheet 2

INVENTOR.
ROBERT D. HITCHCOCK
BY *Joseph N. Golant*
ATTORNEY.

300
United States Patent Office 3,500,145
Patented Mar. 10, 1970

3,500,145
THIN VAPOR-DEPOSITED METAL FILM VOLTAGE REGULATOR
Robert D. Hitchcock, Ventura, Calif., assignor to the United States of America as represented by the Secretary of the Navy
Filed Mar. 1, 1967, Ser. No. 620,214
Int. Cl. H01l 3/00, 5/00, 7/00
U.S. Cl. 317—238                                       1 Claim

ABSTRACT OF THE DISCLOSURE

The invention is a thin film voltage regulator and its method of manufacture comprising a sandwich of aluminum, aluminum oxide, manganese and lead. The thickness of the regulator is of the order of $10^{-5}$ cm. The manufacture comprises vaporizing and depositing the aluminum, manganese and lead at a pressure of only $10^{-3}$ torr with an oxidation step after the depositing of aluminum. A double mask arrangement facilitates ease of manufacture.

BACKGROUND OF THE INVENTION

Field of the invention

The present invention relates to voltage regulators and more particularly to thin film voltage regulators primarily for use in microelectronic circuits.

Description of prior arts

Voltage regulators are old in the art; but with the advent of miniaturization of circuitry brought on by the introduction of the transistor, circuit components including the voltage regulator were required to be reduced in size. Today small bulk transistorized voltage regulators exist. However, even the bulk voltage regulators are too large for certain applications where size and weight are critical factors, such as in space applications.

The older techniques for voltage regulation use either gas-filled electron tubes or the abovementioned bulk solid state devices. One disadvantage of such regulators is their large size. Although bulk solid state voltage regulators, i.e., the Zener diode, are much smaller than the gas-filled tube, they are still larger by many orders of magnitude than thin film devices. Hence, the bulk solid state diode does not permit the high packaging density and reduction in overall system weight which is possible with integrated thin film devices.

Bulk devices in the prior art showing layer construction of metal and oxide and metal have shown good rectifying characteristics. But it is noted that a reduction in size greatly affects electrical characteristics because of the corresponding physics phenomenon change. Also some thin film devices are being produced for various functions; however, their methods of manufacture are extremely expensive.

SUMMARY OF THE INVENTION

The invention is a thin film voltage regulator apparatus and the manufacture thereof of a size smaller than the bulk solid state voltage regulator and comprises vaporizing and depositing a metal to form a base electrode film; the film is covered by an oxide film, which in turn is covered by vaporizing and depositing a barrier element, to form a barrier film; the barrier film is covered by vaporizing and depositing a metal to form a counter electrode film. A preferred embodiment of my invention has the base electrode film of aluminum, the oxide film of aluminum oxide, the barrier film of manganese and the counter electrode film of lead.

The invention has at least four advantages: (1) a smaller thickness as already mentioned permitting higher packaging densities with a corresponding decrease in overall system weight; (2) a symmetrical I-V plot which allows the invention to be used to regulate AC voltages at least up to 60 cycles per second (Zener diodes have asymmetrical I-V plots and cannot be used individually to regulate AC voltages); (3) a lower cost to produce than a semiconductor diode because the thin film diode using pure metal is easier to manufacture; (4) an I-V plot which is reproducible for an indefinite period of time.

It is therefore an object of the invention to provide a thin film voltage regulator which is easy and inexpensive to manufacture.

Another object of the invention is to provide a thin film voltage regulator of extremely small size so that high packaging densities can be achieved and overall weight of a system requiring the regulators can be reduced.

A further object of the invention is to provide a thin film voltage regulator which is stable for long periods of time providing the symmetrical (current-voltage) characteristics which enable AC voltage regulation.

BRIEF DESCRIPTION OF THE DRAWING

Referring now to the drawing wherein like reference numerals designate like or corresponding parts throughout the several views, there is shown in FIG. 1 a voltage regulator 10 which is mounted upon a substrate 12. FIG. 2 is an enlarged partial front section view illustrating the formation of the several films which comprise the voltage regulator.

Generally, the thin film voltage regulator is comprised of a sandwich package with the following layers: a base electrode film, an oxide film, a barrier film, and a counter electrode film forming the top of the sandwich package. In a preferred embodiment the invention is comprised of an aluminum film 14 as the base electrode; an aluminum oxide film 16 as the oxide film; a manganese film 18 as the barrier film; and a lead film 20 as the counter electrode film. Electron flow through the voltage regulator commences at the lead counter electrode film 20 and proceeds through the manganese and aluminum-oxide films on to the aluminum base electrode film 14. The aluminum oxide film acts as a tunneling barrier while the manganese film acts as a stabilizing barrier in that among other things it apparently stops the lead counter electrode film 20 from diffusing into and through the aluminum oxide film 16 and causing a short circuit.

Figure 3:
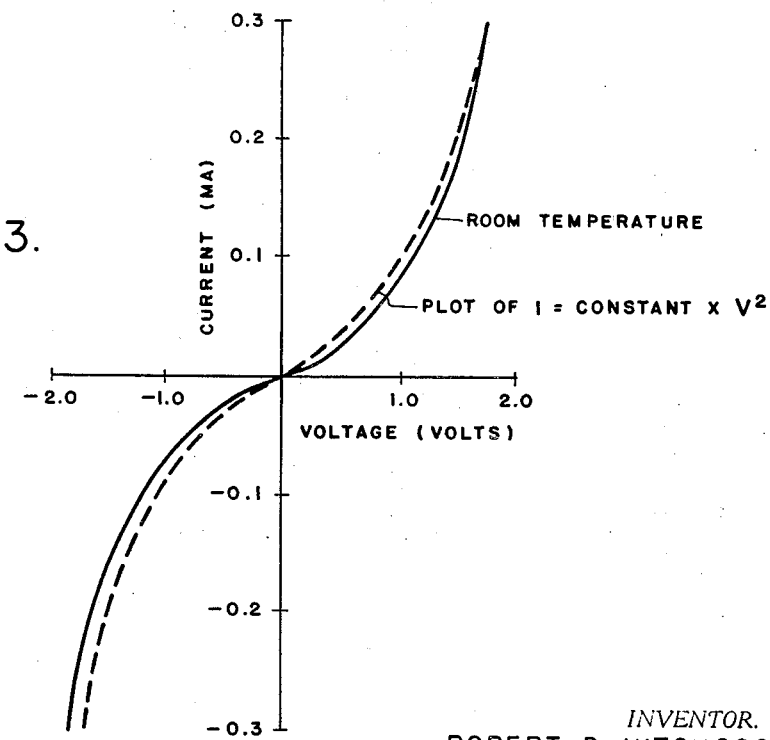
FIG. 3 is a current-voltage (I-V) plot illustrating the operative characteristics of the preferred embodiment as compared to a calculated theoretical characteristic curve.

Because of the small thickness of the aluminum-oxide film, current passes through it as the result of quantium-mechanical tunneling of electrons. In addition, space-charge-limited current flow takes place in the invention, and it is this latter process which causes the I-V plot to behave as shown in FIG. 3. It is believed that the manganese barrier is mainly responsible for the space-charge-limited current flow, as well as providing long term stability of the I-V characteristic under AC operation.

I have found from experiment that for the desired characteristic curve shown in FIG. 3 the range of thickness of the films should be as follows: the aluminum electrode film, $1\times10^{-5}$ to $3\times10^{-5}$ cm., the aluminum oxide film, about $5 \times 10^{-7}$ cm., the maganese film, $5 \times 10^{-7}$ to $5 \times 10^{-6}$ cm., and the lead film, $1 \times 10^{-5}$ to $3 \times 10^{-5}$ cm. Such thin film sizes compare favorably to the bulk transistor sizes which are on the order to $10^{-2}$ cm.; the size of my thin-film voltage regulator may be in a range from about $6.55 \times 10^{-5}$ to about $2.1 \times 10^{-5}$ cm. while the width of each film is one mm. Hence there is a substantial space savings. There would also be a corresponding savings in weight.

Manganese was chosen as a barrier material for the preferred embodiment because of its relatively low melting point which enables easier manufacturing, thus achieving a major advantage over the prior art. It is noted that the present invention is no mere reduction in size of a preexisting device, because as one reduces size electrical characteristics begin to change so that a combination as described above may have one set of characteristics in bulk form while another set of characteristics in thin film form. Presently a lower limit in size exists in that continuous reduction of thicknesses creates problems in manufacturing, structural integrity, and electrical characteristics.

METHOD OF MANUFACTURE

Included in my invention is a preferred method of manufacture as follows:

*Substrate.*—A rectangular piece of glass may be cut from a microscope slide and forms the substrate 12. The size of the rectangle is 1 x 12 x 25 mm. Substrate 12 is cleaned in ethyl alcohol and wiped dry with tissue; no additional cleaning need be employed. Indium-metal patches 22, 24, 26 and 28 may be smeared on each of the four edges of the substrate to provide solder connections to be used for connecting wire leads 30, 32, 34 and 36 to an external circuit (not shown).

*Aluminum.*—Next the aluminum electrode film is deposited upon the glass substrate 12. The aluminum is deposited by vaporization. To case the aluminum to evaporate a 6-turn, 7 mm. diameter helix of 0.03 inch diameter tungsten wire is prepared. Six pieces of 0.03 inch diameter, ⅜ inch long aluminum wire (99.99% pure) are each folded twice and clamped to the tungsten filament on each turn. The aluminum pieces are then melted to form six heads wetting the tungsten wire. The above process may be accomplished in a vacuum bell jar 50, FIG. 4, 16 inches in diameter by 14 inches high with a pumping system consisting of a 2 inch oil diffusion pump, water-cooled baffle and 5 cubic feet per minute backing pump (not shown). The pressure within the vacuum jar was maintained at about $10^{-3}$ torr (a torr is equal to the pressure of 1 mm. of mercury).

Figure 5:
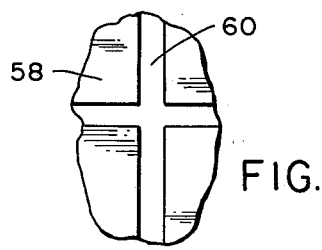
FIG. 5 is an enlarged partial plan view of a movable mask shown in FIG. 4.

The aluminum is to be deposited upon the glass substrate in the form of a 1 mm. wide strip, about 25 mm. long. This may be accomplished by using two masks fabricated from medium thickness aluminum foil. A first mask 52 is fixed in a horizontal plane about 3 cm. above the tungsten filament 54 with the six aluminum beads; a 1 x 25 mm. slot 56 has been cut in the mask. A second mask 58 is movable placed in a horizontal plane about 1 mm. above the fixed mask. Attached by Scotch tape to the top of the movable mask may be the glass substrate 12 with its four indium patches. A "cross" 60, FIG. 5, 25 x 12 mm. is cut in the second mask, comprising two mm. slots at right angles to each other, that is, one slot extends perpendicular from the other slot. The aluminum beads are then heated until they are liquid; the heating is done by passing 25 amperes of current through the tungsten filament 54 for about 30 seconds while the pressure in the vacuum jar is held below $10^{-3}$ torr. While the aluminum beads are being heated, the movable mask 58 with the attached substrate is positioned away from the fixed mask. When the 30 seconds have elapsed the movable mask with the substrate assembly is swung over the fixed mask so that the 25 mm. slot of the cross 60 on the movable mask is aligned with the slot in the fixed mask. The aluminum is then deposited for 5 seconds upon the substrate covering the glass and the two opposite indium patches 24 and 28. The pressure during the 5 second deposit is held at $10^{-3}$ torr while the filament current is held at 25 amperes.

*Aluminum oxide.*—The aluminum oxide layer is formed by exposing the aluminum strip to the atmosphere (at standard conditions) for a length of time between 10 minutes and 16 hours.

Figure 1:
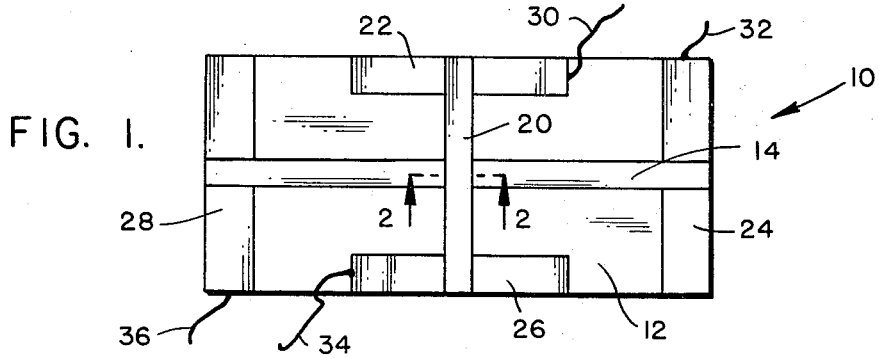
FIG. 1 is a plan view of a preferred embodiment of the present invention mounted upon a substrate adapted to be connected to a circuit.

*Manganese.*—A thin film strip of manganese is then deposited across the aluminum oxide at right angles (the manganese 18 would lie just beneath the lead 20 as shown in FIG. 1). The manganese is deposited by vaporizing powdered manganese from a small graphite crucible 62, FIG. 4. The crucible is ¼ inch diameter by ⅜ inch high and drilled to a depth of ¼ inch with a 3/16 inch hole. The crucible, in turn, is held in a 3-turn basket of tantalum wire 64 0.04 inch in diameter. A current of about 40 amperes is passed through the tantalum wire heating the crucible for about 120 seconds while the pressure within the chamber is at $10^{-3}$ torr. During this heating of the crucible the substrate is positioned away from the fixed masks over the crucible. Movement of the substrate mask arrangement may be by handle 66. The fixed mask 52a over the crucible is constructed very similar to the fixed mask used during the aluminum deposit, however the slot 56a in this new mask is cut so that when the movable mask is positioned over it, the 12 mm. slot of the cross 60 lines up with the fixed slot 56a. A configuration results like that shown in FIG. 1 wherein the aluminum and aluminum oxide film may be considered as denoted by 14 horizontally (in the drawing) across the substrate while the manganese (and lead) may be designated by 20 vertically across the substrate.

Figure 4:
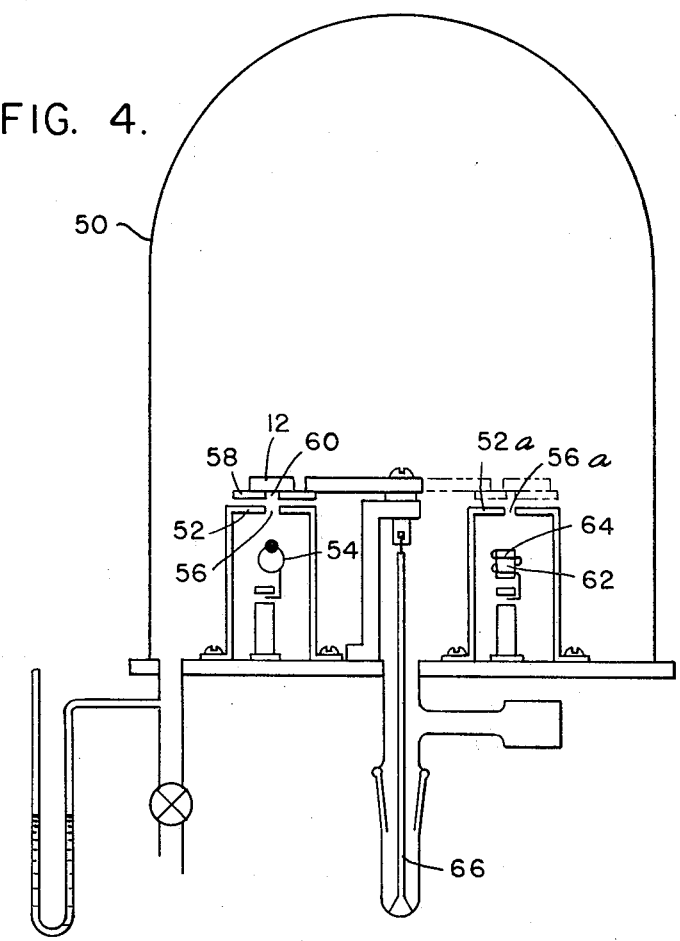
FIG. 4 is a diagrammatic view of a vacuum deposition apparatus which may be used for the construction of a thin film voltage regulator.

The manganese is deposited after the crucible has been heated for about 120 seconds by swinging the movable mask 58 with substrate over the fixed mask 52a (as shown in phantom lines, FIG. 4). Deposition is carried on for a period of time between 5 and 20 seconds, current being held at about 35 amperes during the deposition period. Like the aluminum deposition, the distance between the fixed mask and the movable mask is 1 mm. Pressure is maintained at $10^{-3}$ torr.

Figure 2:
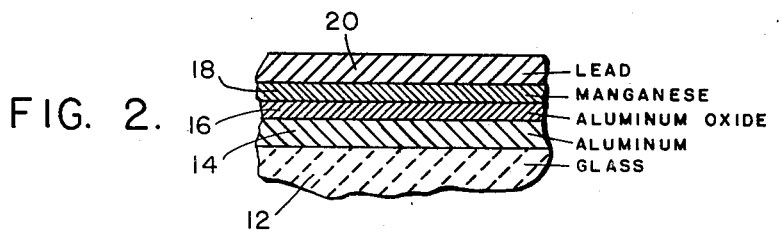
FIG. 2 is an enlarged partial front section view of the thin film voltage regulator.

*Lead.*—Finally a thin film strip of lead is deposited over the manganese strip by vaporizing the lead from a crucible source similar to that described for the manganese. The lead is to completely cover the manganese. Lead pellets may be placed within a crucible which is held by the basket of tantalum wire 64. The lead pellets are to be 99.99% pure. The dimensions for the basket and the crucible are identical to that used in the previous step. The crucible is heated for 30 seconds while the pressure in the chamber is at $10^{-3}$ torr. During the heating of the crucible the substrate is positioned away from the fixed mask over the crucible. The same fixed mask as used for the manganese is again used for the lead, being 3 cm. above the crucible. The movable mask is 1 mm. above the fixed mask. The lead and manganese make a connection with the opposite indium-metal patches 22 and 26 and form the completed thin film voltage regulator as shown in FIG. 1 with the individual layers as shown in FIG. 2.

One advantage of my method is that relatively inexpensive equipment may be used and the steps comprising the process are greatly simplified. The prior art shows manufacturing processes requiring elaborate cooling procedures and requiring deposition to take place at a pressure of about $10^{-6}$ torr. It is believed that the mask arrangement and the placement of the substrate away from the vaporizing metal until deposition is to actually take place allows operation at a pressure of only $10^{-3}$ torr. Another major advantage, over other methods of fabricating a thin-film sandwich voltage regulator exhibiting space-charge-limited current flow, is the use of manganese between the outer electrodes (aluminum and lead) which is easier to deposit than a material such as boron, having a much higher vaporization temperature than manganese and requiring such techniques as electron-beam deposition, a more complicated and costly method than simple vaporization from a heated crucible.

Obviously many modifications and variations of the present invention are possible in the light of the above teachings. It is therefore to be understood that within the scope of the appended claim the invention may be practiced otherwise than as specifically described.

I claim:
1. A thin film voltage regulator comprising:
   an aluminum base electrode film having a thickness of about $1 \times 10^{-5}$ cm. to $3 \times 10^{-5}$ cm. said film being adapted to be supported by a substrate;
   an aluminum oxide film of about $5 \times 10^{-7}$ cm. thickness in imediate contact with said base electrode film and supported thereby;
   a barrier film of manganese having a thickness of about $5 \times 10^{-7}$ cm. to $5 \times 10^{-6}$ cm. in immediate contact with said oxide film and supported thereby; and
   a lead counter electrode film having a thickness of about $1 \times 10^{-5}$ cm. to $3 \times 10^{-5}$ cm. in immediate contact with said barrier film and supported thereby.

References Cited

UNITED STATES PATENTS 2,822,606  22/1958  Koji Yoshida ____ 317—238 X

FOREIGN PATENTS 1,177,253  9/1964  Germany.

JOHN W. HUCKERT, Primary Examiner
A. J. JAMES, Assistant Examiner

U.S. Cl. X.R.

29—25.3; 317—234, 237